US012650761B2

(12) United States Patent
Xie et al.

(10) Patent No.: US 12,650,761 B2
(45) Date of Patent: Jun. 9, 2026

(54) METHOD FOR INTERACTION, APPARATUS, ELECTRONIC DEVICE AND STORAGE MEDIUM

(71) Applicant: Beijing Zitiao Network Technology Co., Ltd., Beijing (CN)

(72) Inventors: Shaohan Xie, Beijing (CN); Siyao Jin, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 214 days.

(21) Appl. No.: 18/570,622

(22) PCT Filed: Sep. 13, 2022

(86) PCT No.: PCT/CN2022/118300
§ 371 (c)(1),
(2) Date: Dec. 14, 2023

(87) PCT Pub. No.: WO2023/040791
PCT Pub. Date: Mar. 23, 2023

(65) Prior Publication Data
US 2024/0288996 A1     Aug. 29, 2024

(30) Foreign Application Priority Data

Sep. 18, 2021     (CN) .......................... 202111101162.0

(51) Int. Cl.
| | | |
|---|---|---|
| *G06F 3/0484* | (2022.01) | |
| *G06F 3/0481* | (2022.01) | |
| *H04L 51/046* | (2022.01) | |

(52) U.S. Cl.
CPC .......... *G06F 3/0484* (2013.01); *G06F 3/0481* (2013.01); *H04L 51/046* (2013.01)

(58) Field of Classification Search
None
See application file for complete search history.

(56) References Cited

U.S. PATENT DOCUMENTS

| | | | | |
|---|---|---|---|---|
| 11,038,974 B1 * | 6/2021 | Koukoumidis | ..... | H04L 43/0882 |
| 11,375,256 B1 * | 6/2022 | Dorner | ..................... | G06N 3/04 |

(Continued)

FOREIGN PATENT DOCUMENTS

| | | |
|---|---|---|
| CN | 102655633 B | 11/2015 |
| CN | 106506475 A | 3/2017 |

(Continued)

OTHER PUBLICATIONS

International Patent Application No. PCT/CN2022/118300; Int'l Search Report; dated Nov. 30, 2022; 2 pages.

(Continued)

*Primary Examiner* — Tuyetlien T Tran
(74) *Attorney, Agent, or Firm* — BakerHostetler

(57) ABSTRACT

The present disclosure provides a method for interaction, apparatus, electronic device, and storage medium. The method for interaction comprises: determining whether a target user in a target group within an application achieves a predetermined objective; and in response to that the target user achieves the predetermined objective, presenting an interaction control on a conversation interface of the target group, wherein the interaction control is configured for an interaction between the target user and rest group members in the target group.

16 Claims, 8 Drawing Sheets

(56)  References Cited

U.S. PATENT DOCUMENTS

| | | | |
|---|---|---|---|
| 11,863,513 B2 * | 1/2024 | Boyd .................... | H04L 51/214 |
| 2010/0131654 A1 | 5/2010 | Malakapalli et al. | |
| 2013/0339358 A1 * | 12/2013 | Huibers ................. | H04L 51/52 |
| | | | 707/737 |
| 2014/0012927 A1 * | 1/2014 | Gertzfield ............. | G06F 16/287 |
| | | | 709/206 |
| 2017/0111299 A1 * | 4/2017 | Arisada ................. | H04L 51/046 |
| 2019/0189117 A1 | 6/2019 | Kumar | |
| 2021/0105242 A1 * | 4/2021 | Babayeva ........... | H04L 12/2825 |
| 2021/0152384 A1 * | 5/2021 | Enderby ............. | H04L 12/1877 |
| 2021/0176202 A1 * | 6/2021 | Tran ..................... | G06Q 20/389 |
| 2022/0006840 A1 * | 1/2022 | Ng ..................... | G06Q 10/0635 |
| 2022/0417566 A1 * | 12/2022 | Tang ................. | H04N 21/4312 |

FOREIGN PATENT DOCUMENTS

| | | | |
|---|---|---|---|
| CN | 108391174 | A | 8/2018 |
| CN | 109688450 | A | 4/2019 |
| CN | 109788327 | A | 5/2019 |
| CN | 111600730 | A | 8/2020 |
| CN | 111757135 | A | 10/2020 |
| CN | 112153407 | A | 12/2020 |
| CN | 112184469 | A | 1/2021 |
| CN | 112764612 | A | 5/2021 |
| CN | 113760145 | A | 12/2021 |
| WO | WO2021139436 | A1 | 7/2021 |

OTHER PUBLICATIONS

"How can a newcomer to WeChat group automatically send a group announcement when it joins the group?"; https://www.sohu.com/a/394025728_120205836; Sohu; May 2020; accessed Dec. 14, 2023; 3 pages (contains English Translation).

Chinese Application No. 202111101162.0; Notification of Grant dated Jan. 8, 2024; 6 pages with machine-generated translation.

Xia Huosong, et al., "Knowledge Sharing Behavior Based on QQ Groups Mining of R," Journal of Intelligence, May 2016, vol. 35, No. 5, 6 pages with English abstract.

* cited by examiner

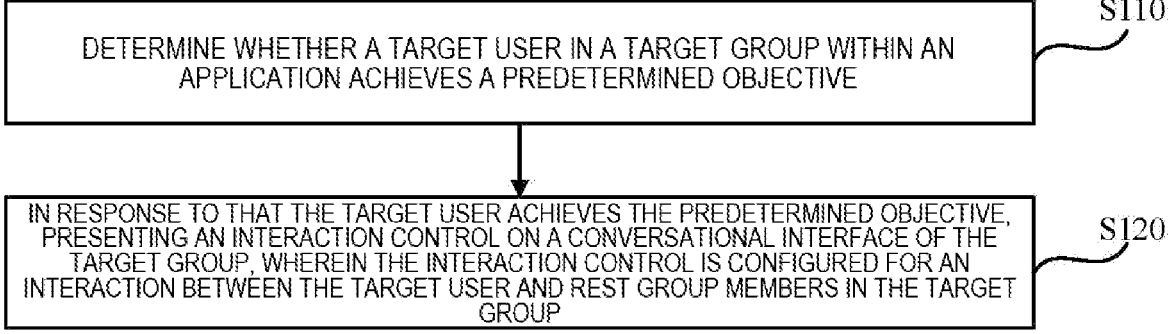

S110

DETERMINE WHETHER A TARGET USER IN A TARGET GROUP WITHIN AN
APPLICATION ACHIEVES A PREDETERMINED OBJECTIVE

S120

IN RESPONSE TO THAT THE TARGET USER ACHIEVES THE PREDETERMINED OBJECTIVE,
PRESENTING AN INTERACTION CONTROL ON A CONVERSATIONAL INTERFACE OF THE
TARGET GROUP, WHEREIN THE INTERACTION CONTROL IS CONFIGURED FOR AN
INTERACTION BETWEEN THE TARGET USER AND REST GROUP MEMBERS IN THE TARGET
GROUP

FIG. 1

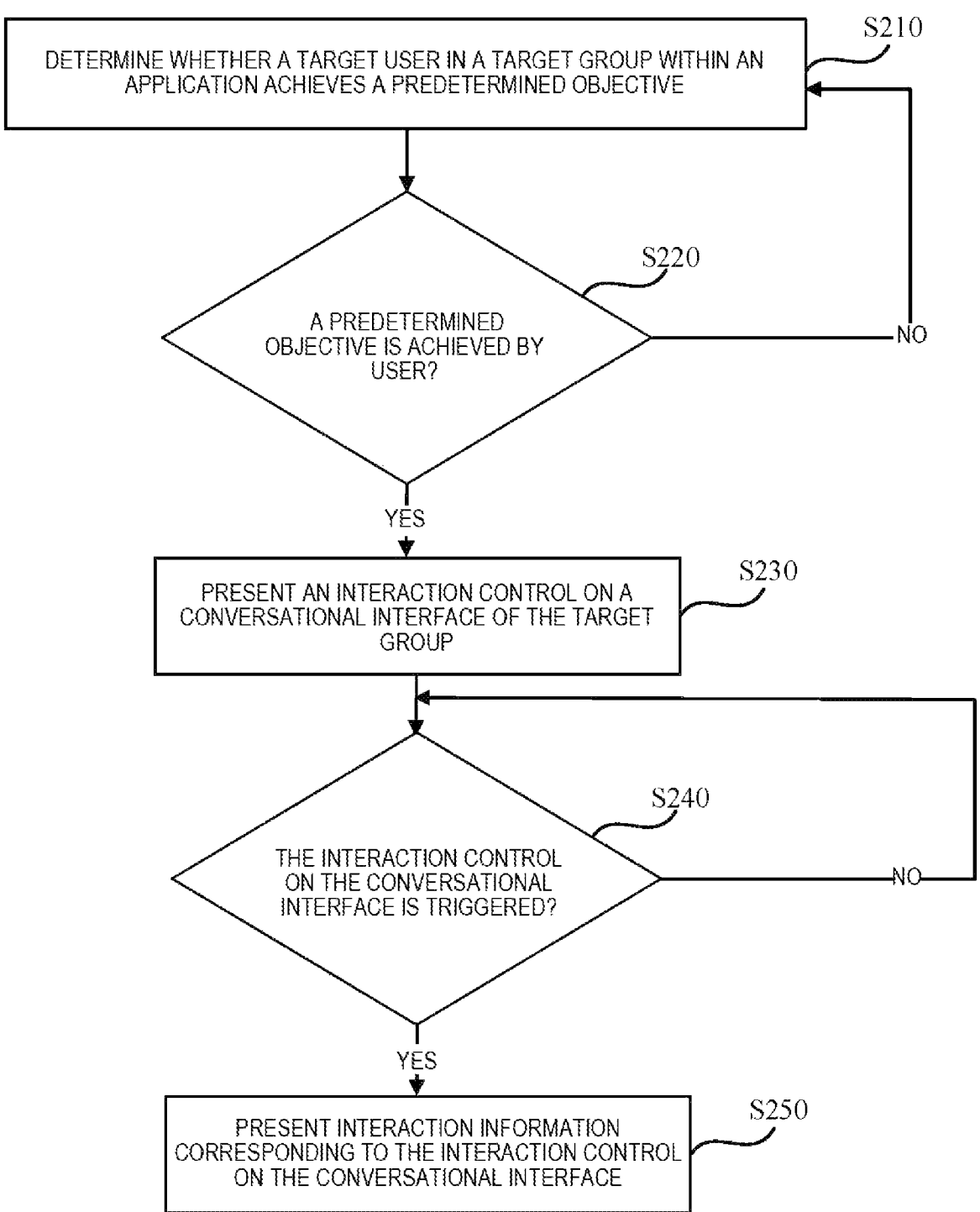

DETERMINE WHETHER A TARGET USER IN A TARGET GROUP WITHIN AN APPLICATION ACHIEVES A PREDETERMINED OBJECTIVE — S210

A PREDETERMINED OBJECTIVE IS ACHIEVED BY USER? — S220

NO

YES

PRESENT AN INTERACTION CONTROL ON A CONVERSATIONAL INTERFACE OF THE TARGET GROUP — S230

THE INTERACTION CONTROL ON THE CONVERSATIONAL INTERFACE IS TRIGGERED? — S240

NO

YES

PRESENT INTERACTION INFORMATION CORRESPONDING TO THE INTERACTION CONTROL ON THE CONVERSATIONAL INTERFACE — S250

Figures 9, 10:
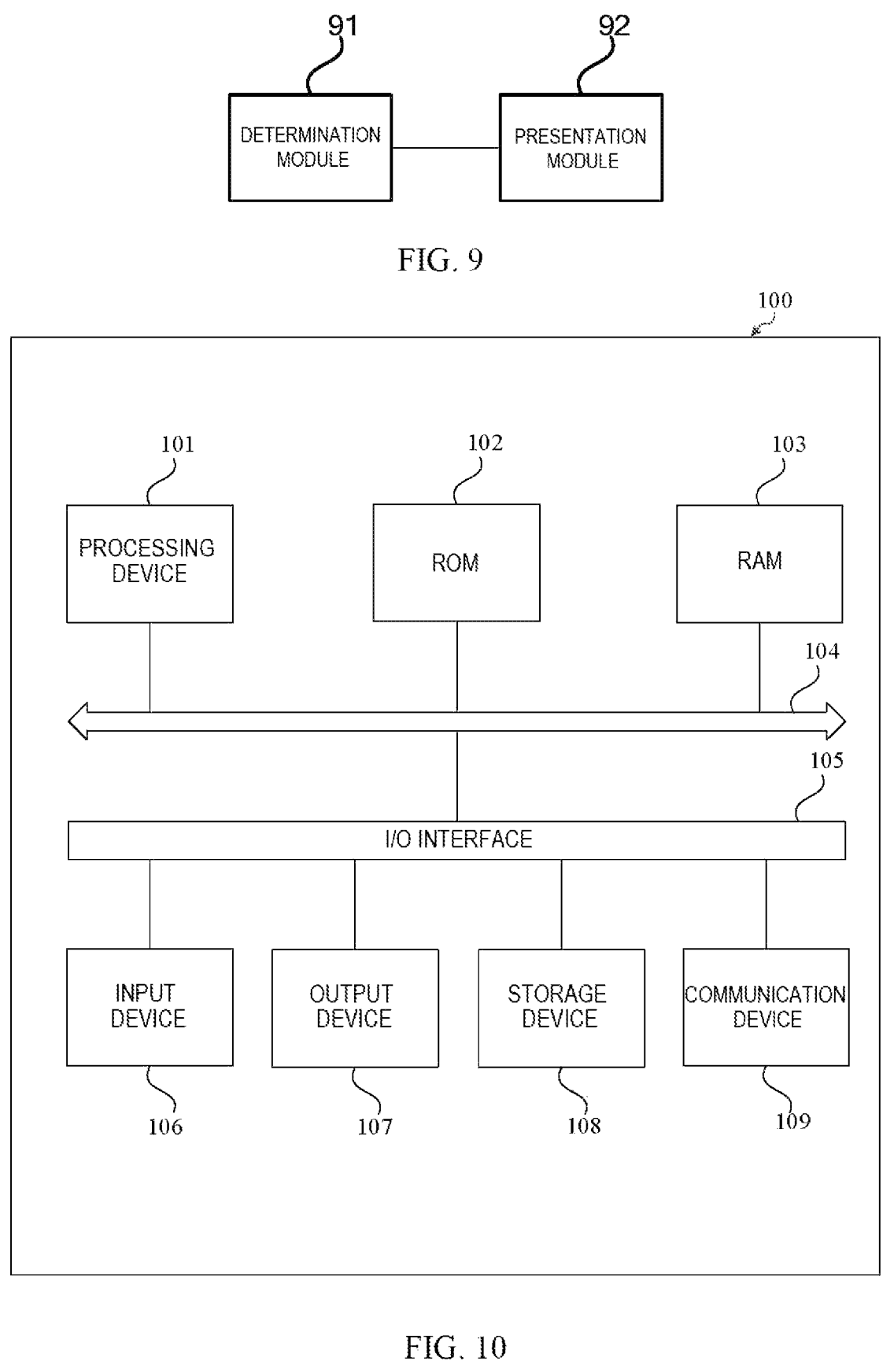

DETERMINATION
MODULE

PRESENTATION
MODULE

PROCESSING
DEVICE

ROM

RAM

104

105

I/O INTERFACE

INPUT
DEVICE

OUTPUT
DEVICE

STORAGE
DEVICE

COMMUNICATION
DEVICE

METHOD FOR INTERACTION, APPARATUS, ELECTRONIC DEVICE AND STORAGE MEDIUM

This application is a U.S. National Stage Application of PCT Application No. PCT/CN2022/118300, filed Sep. 13, 2022, which claims the priority of Chinese Patent Application No. 202111101162.0, filed on Sep. 18, 2021, entitled "METHOD FOR INTERACTION, APPARATUS, ELECTRONIC DEVICE AND STORAGE MEDIUM", both of which are incorporated herein by reference in their entities.

FIELD

Embodiments of the present disclosure relates to the field of computer technology, for example, to a method for interaction, apparatus, electronic device and storage medium.

BACKGROUND

As people's living needs grows increases by leaps and bounds, various types of applications have emerged.

Some applications are operated with group function, such as follower groups on media platforms. The owner and followers of the follower group can interact within the group by sending text, voice, emojis, and images.

SUMMARY

The present disclosure provides a method for interaction, apparatus, electronic device and storage medium, which effectively enhances the interactivity between the target user and the rest group members within the target group of the application.

This disclosure provides a method for interaction comprising:

determining whether a target user in a target group within an application achieves a predetermined objective;

in response to that the target user achieves the predetermined objective, presenting an interaction control on a conversation interface of the target group, wherein the interaction control is configured for an interaction between the target user and rest group members in the target group.

The present disclosure also provides an apparatus for interaction comprising:

a determination module configured for determining whether a target user in a target group within an application achieves a predetermined objective;

a presentation module configured for, in response to that the target user achieves the predetermined objective, presenting an interaction control on a conversation interface of the target group, wherein the interaction control is configured for an interaction between the target user and rest group members in the target group.

The present disclosure further provides an electronic device comprising:

one or more processing devices;

a storage apparatus configured for storing one or more programs;

the one or more programs, when executed by the one or more processors, cause the one or more processors to perform a method for interaction provided by the present disclosure.

The present disclosure further provides a computer-readable medium storing a computer program thereon, the program, when executed by a processor, implementing a method for interaction provided by the present disclosure.

BRIEF DESCRIPTION OF THE DRAWINGS

FIG. 1 is a flowchart of a method for interaction according to the first embodiment of the present disclosure;

FIG. 8 is a flowchart of a method for interaction according to the second embodiment of the present disclosure;

FIG. 9 is a schematic diagram of the structure of an apparatus for interaction provided in the third embodiment of the present disclosure;

FIG. 10 is a schematic structural diagram of an electronic device according to the fourth embodiment of the present disclosure.

DETAILED DESCRIPTION

Figure 2:
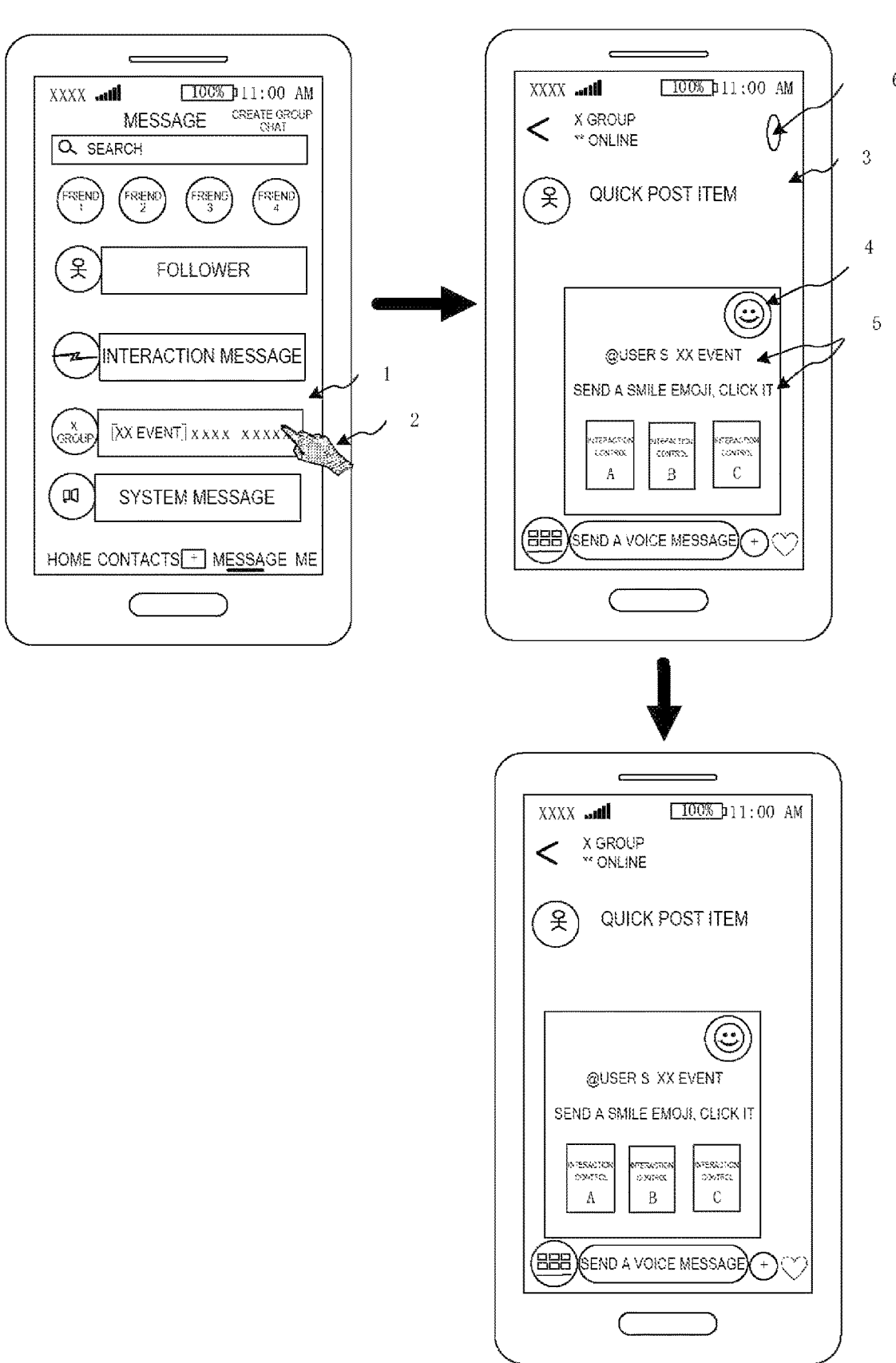
FIG. 2 is a schematic diagram of an interface for a method for interaction according to the first embodiment of the present disclosure.

The following embodiments of the present disclosure will be described with reference to the accompanying drawings. Although some embodiments of the present disclosure are shown in the drawings, the present disclosure can be implemented in various forms, and these embodiments are provided to understand the present disclosure. The drawings and embodiments of the present disclosure are for illustrative purposes only.

Multiple steps described in the method implementation method of this disclosure can be executed in different orders and/or in parallel. In addition, the method implementation method can include additional steps and/or omit the steps shown. The scope of this disclosure is not limited in this regard.

The term "including" and its variations used in this article are open-ended, i.e. "including but not limited to". The term "based on" means "at least partially based on". The term "one embodiment" means "at least one embodiment"; the term "another embodiment" means "at least one additional embodiment"; and the term "some embodiments" means "at least some embodiments". Relevant definitions of other terms will be given in the following description.

The concepts of "first" and "second" mentioned in this disclosure are only used to distinguish different devices, modules, or units, and are not used to limit the order or interdependence of the functions performed by these devices, modules, or units.

The modifications of "one" and "multiple" mentioned in this disclosure are illustrative and not restrictive. Those skilled in the art should understand that unless otherwise specified in the context, they should be understood as "one or more".

The names of the messages or information exchanged between multiple devices in this public implementation are for illustrative purposes only and are not intended to limit the scope of these messages or information.

In the following embodiments, optional features and examples are provided in each embodiment. Multiple features described in the embodiments can be combined to form multiple optional solutions. Each numbered embodiment should not be regarded as only one technical solution. In addition, without conflict, the embodiments and features in the present disclosure can be combined with each other.

Currently, the solution of interaction within a group is mostly initiated by group members when they have interactive needs, resulting in poor interactivity among group members within the group. The embodiments of the present disclosure may solve this problem.

Embodiment 1

FIG. 1 is a flowchart of a method for interaction according to an embodiment of the present disclosure. This method is applicable to enhance the interaction between the target user and the rest group members within the target group of the application. The method may be performed by an apparatus for interaction and this apparatus may be implemented by software and/or hardware, and generally integrated on an electronic device. In the present embodiment, the electronic device may comprise mobile phones, computers and other devices.

As shown in FIG. 1, in the first embodiment of the present disclosure provides, there is provided a method for interaction. The method comprises:

$S_{110}$, determine whether a target user in a target group within an application achieves a predetermined objective.

In this embodiment, the application can be a program that includes a target group and can interact with users. The target group can be considered as the group where the target user is located. The present disclosure will improve the interactivity between the target user and at least one rest group member in the target group. In the present disclosure, users may include the target user and rest group members. Users can be considered as persons who use the application. The target user can be considered as a user of interest to the rest group member in the target group. For example, the target user can be the creator or the manager of the target group. The rest group members can be followers, enthusiasts, or admirers of the target user in the target group.

The predetermined objective can be considered as an objective to be achieved that is set by the target user when using the application. The predetermined objective can be a milestone objective, that is, an objective with milestone symbols. No restrictions on the setters of predetermined objective, which may be set by the target user, a rest group member, or an application default. No restrictions on the content of the predetermined objective, which can be any objective involved in the use of the application. Different applications correspond to different predetermined objectives. For example, if the application is a short form video social platform, the predetermined objective can be set as the number of published short form videos reaching a predetermined threshold; and/or, the number of users with predetermined association with the target user reaching the first predetermined threshold; and/or, the number of users participating in events associated with the target user being greater than or equal to the second predetermined threshold;

and/or, the number of interactions associated with the target user being greater than or equal to the third predetermined threshold.

The predetermined threshold, the first predetermined threshold, the second predetermined threshold, and the third predetermined threshold can be any threshold set by the target user or the rest group member, or any default threshold within the application, or any value in the predetermined threshold set. The predetermined threshold set can be set by the target user, a rest group member, or an application default. The first predetermined threshold, the second predetermined threshold, the third predetermined threshold, and the predetermined threshold can correspond to different predetermined thresholds or a same predetermined threshold, which are not limited here.

The predetermined association relationship can be considered as any association with the target user within the application. Exemplary predetermined association relationships include one-way followership and/or two-way followership. One-way followership can be a relationship where only one party follows the other party. Two-way followership can be a relationship where both parties follow to each other. Followership can be changed by manipulating the follow control within the application.

The predetermined association may also comprise being in the same target group. For example, the number of users with predetermined association with target user can be considered as the number of users in the same target group at which the target use is located.

Events associated with target user can be considered as events related to users within the application. As an example, the number of users participating in events associated with target user can include the number of users participating in topic discussions initiated by target user, or the number of users participating in real-time chat initiated by target user. No restrictions on the real-time chat, which may be the multi-party video chat, the multi-party voice chat, or a live streaming through the application.

The number of interactions associated with the target user may include the number of f user visits of an item posted by the target user, the number of reposts of an item posted by the target user, the number of likes on an item posted by the target user, or the number of dialogues with the target user within the application.

The present embodiment is not limited to how to determine whether the predetermined objective, different predetermined objective may correspond to different determination ways.

S120, in response to that the target user achieves the predetermined objective, present an interaction control on a conversation interface of the target group, wherein the interaction control is configured for an interaction between the target user and rest group members in the target group.

The conversation interface can be considered as an interface for interaction between the target user and the rest group members, such as the group chat interface of the target group. Interaction controls can be controls for interaction between the target user and the rest user. No restrictions on the content of interaction controls, which can be used for emoji sending, virtual resource transfer, virtual resource transfer requesting, message sending, etc.

When the target user achieves the predetermined objective, it can be considered that the target user has achieved the milestone objective, and interaction controls can be presented in the conversation interface of the target group, such as presenting interaction controls in the form of cards in the conversation interface (such as group chat interface) to promote the target user and/or the rest group members to operate the interaction controls, thereby the interaction between the rest group members of the target group and the target user can be guided, to achieve the interaction between the target user and the rest group members.

The present embodiment may present interaction controls after the target user and/or the rest group members open the conversation interface. After the target user achieves a predetermined objective, the present embodiment may indicate the target user and/or the rest group members to open the conversation interface by way of a message indication.

FIG. 2 is a schematic diagram of an interface of a method for interaction according to the first embodiment of the present disclosure. As shown in FIG. 2, when the target user achieves a predetermined objective, the message indication interface 1 may present x group, i.e., a control for the message indication of the target group. In addition to the control for the message indication of the target group, controls of other message indications may also be presented. No restrictions on the rest control message indications.

The content presented by the control of the message indication includes "[xx event] xxxx xxxxx", where the xx event can be an event that represents the target user achieving a predetermined objective. As an example, the xx event is that the number of users having association with the target user is greater than or equal to the first predetermined threshold. The number of followers of the target user reaches  ten of thousands (where  ten of thousands is greater than or equal to the first predetermined threshold). After the rest group members 2 operate the control corresponding to the message indication, the electronic device triggers the present of the conversation interface 3, and interaction controls are presented in the conversation interface 3. FIG. 2 shows interaction controls A, B, and C, which cannot be considered as the limitation of the number of interaction controls. The conversation interface 3 may also include identification information 4 of the target user, such as the profile picture of the target user. The conversation interface 3 may also include description information 5. No restrictions on the content of description information 5. As an example, the description information 5 may information characterizing that the target user achieves a predetermined objective. When target user and/or the rest group members 2 open the conversation interface 3 for the first time, the conversation interface 3 may include animated gif emoji 6, which can be associated with events that target user achieves the predetermined objective. As a presentation way, animated gif emoji 6 can be presented as falling from top to bottom of the conversation interface 3 until disappearing from the conversation interface 3. Messages sent by group members of the target group can also be presented in the conversation interface 3. Messages sent by group members of the target group presented in the conversation interface 3 can also have identification information of the sender, to identify the sender.

No restrictions on the presentation mode of interaction controls, the target user identification information 4, and the predetermined objective description information 5 in the conversation interface 3. For example, they can be presented in a card form in the conversation interface 3. FIG. 2 illustrates the conversation interface presented by the electronic device of the rest group members 2 as an example. The conversation interface presented by the electronic device of the target user is similar to that presented by the electronic device of the rest group members 2. The difference is that the description information of the target user side can be also presented the target user side, such as the number of the rest group members 2 currently interacting. The description information on the target user side can be different from the description information 5 on the rest group member 2 side.

No restrictions on the content of the interaction control in FIG. 2, which can be used for emoji sending, virtual resource transfer, virtual resource transfer requesting, message sending, etc.

When the interaction control is a control for emoji sending, the interaction control can directly present emojis for users to choose from. The presented emojis can be emojis associated with the predetermined objective based on the predetermined objective achieved by the target user. The presented emojis include emojis that represent celebration.

Figure 3:
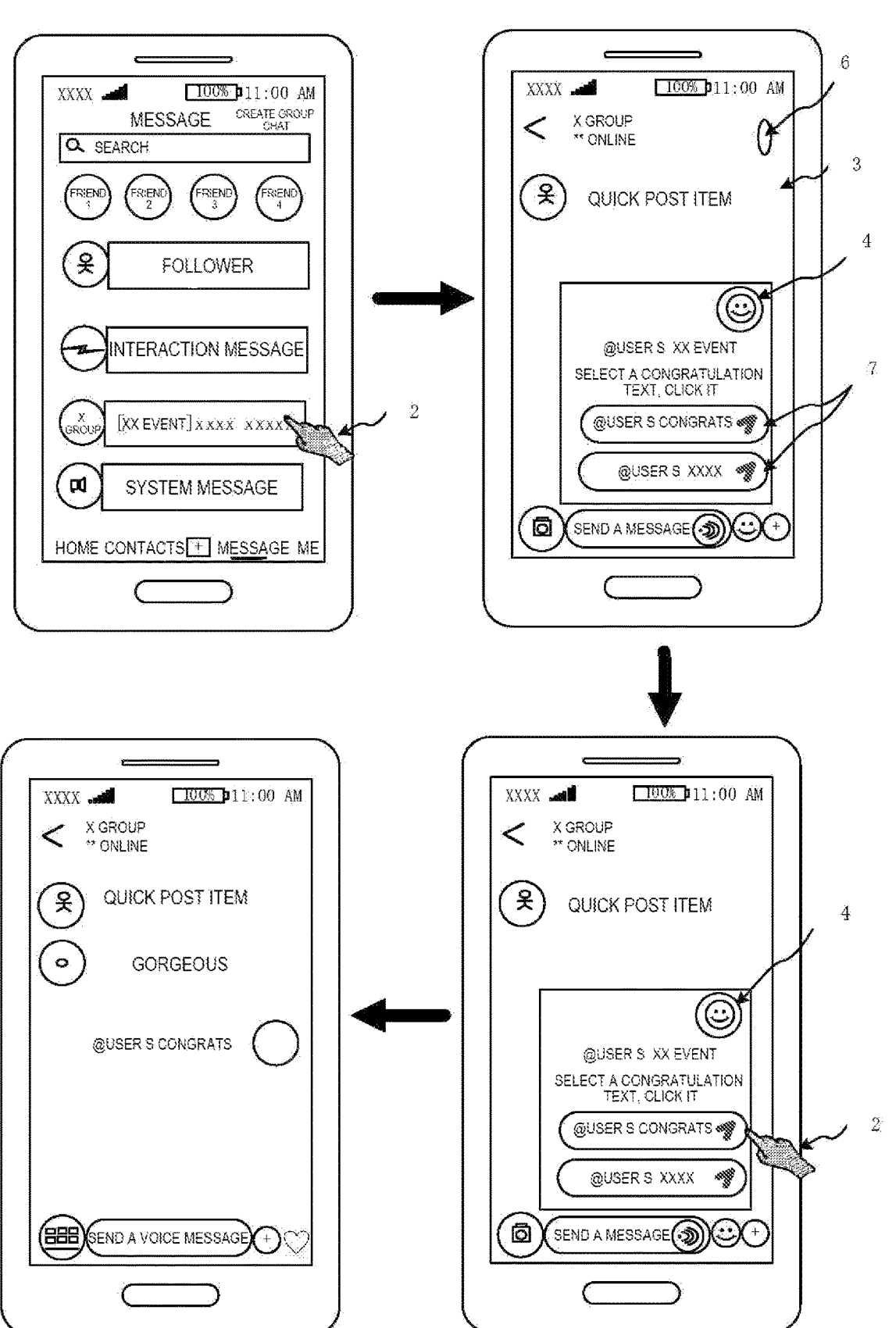
FIG. 3 is a schematic diagram of an interface for a further method for interaction according to the first embodiment of the present disclosure.

Taking the interaction control being the control for message sending as an example, FIG. 3 is a schematic diagram of an interface for a further method for interaction according to the first embodiment of the present disclosure. As shown in FIG. 3, this example is illustrated with the conversation interface 3 presented on the other side of the rest group members 2 as an example. In this example, the interaction controls 7 can be a control for message sending, such as a control for shortcut phrases. The user S can be the identification data of the target user, such as the name of the target user in the application. After the rest group members 2 operate the interaction control 7 of "@user S, congrats", the conversation interface 3 may present "@user S, congrats" to complete the sending of the shortcut phrase. The sent shortcut phrase can be information associated with the predetermined objective achieved by the target user.

Figure 4:
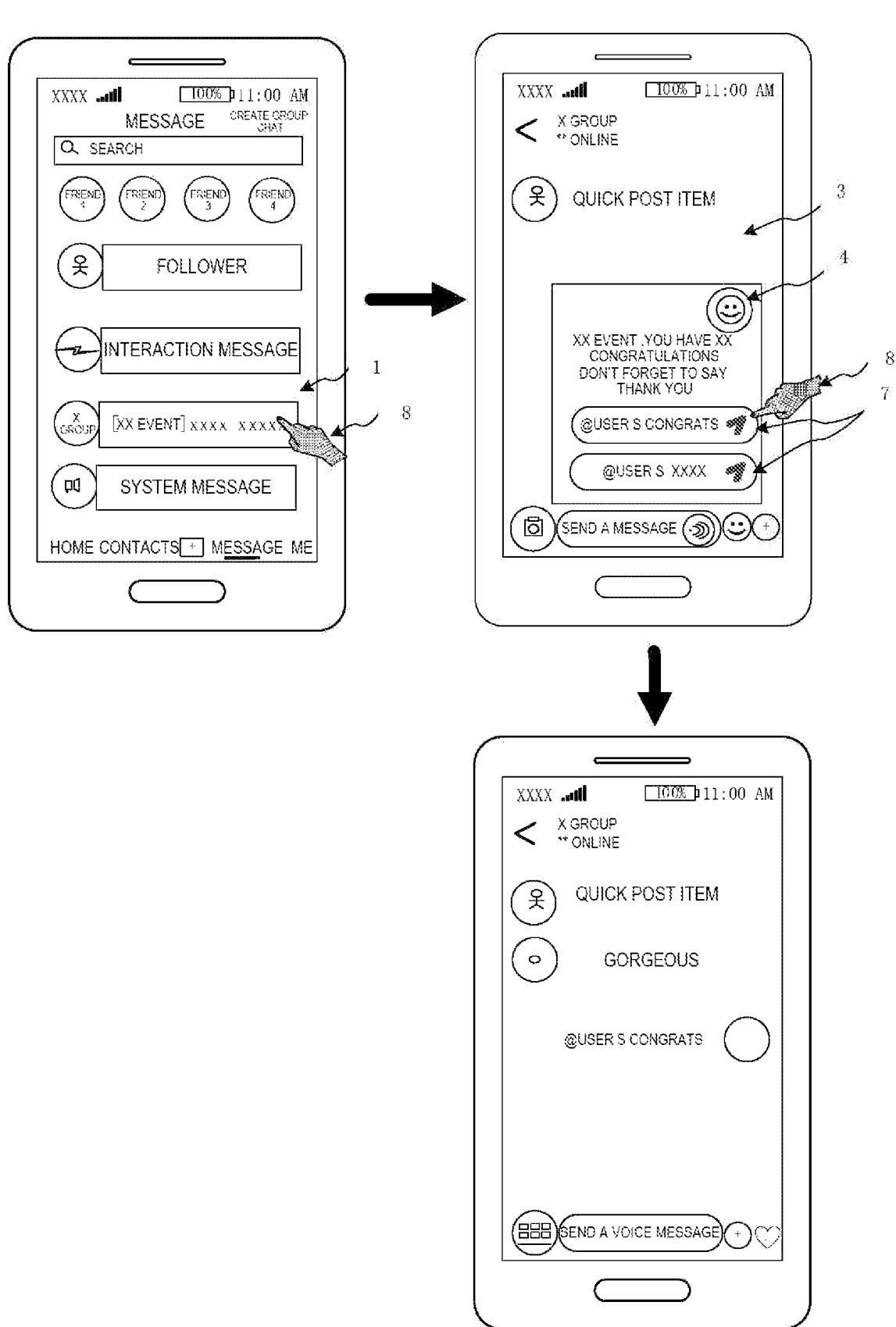
FIG. 4 is a schematic diagram of an interface for a further method for interaction according to the first embodiment of the present disclosure.

Taking the interaction control as the control for message sending as an example, FIG. 4 is a schematic diagram of an interface for a further method for interaction according to the first embodiment of the present disclosure. As shown in FIG. 4, this example is illustrated with the target user 8 side as an example. After the target user 8 operates the message indication control of the target group in the message indication interface 1, the interaction controls 7 are presented on the conversation interface 3. After the target user 8 operates any of interaction controls 7, the shortcut phrase corresponding to the operated interaction control 7 is sent to the conversation interface 3.

Figure 5:
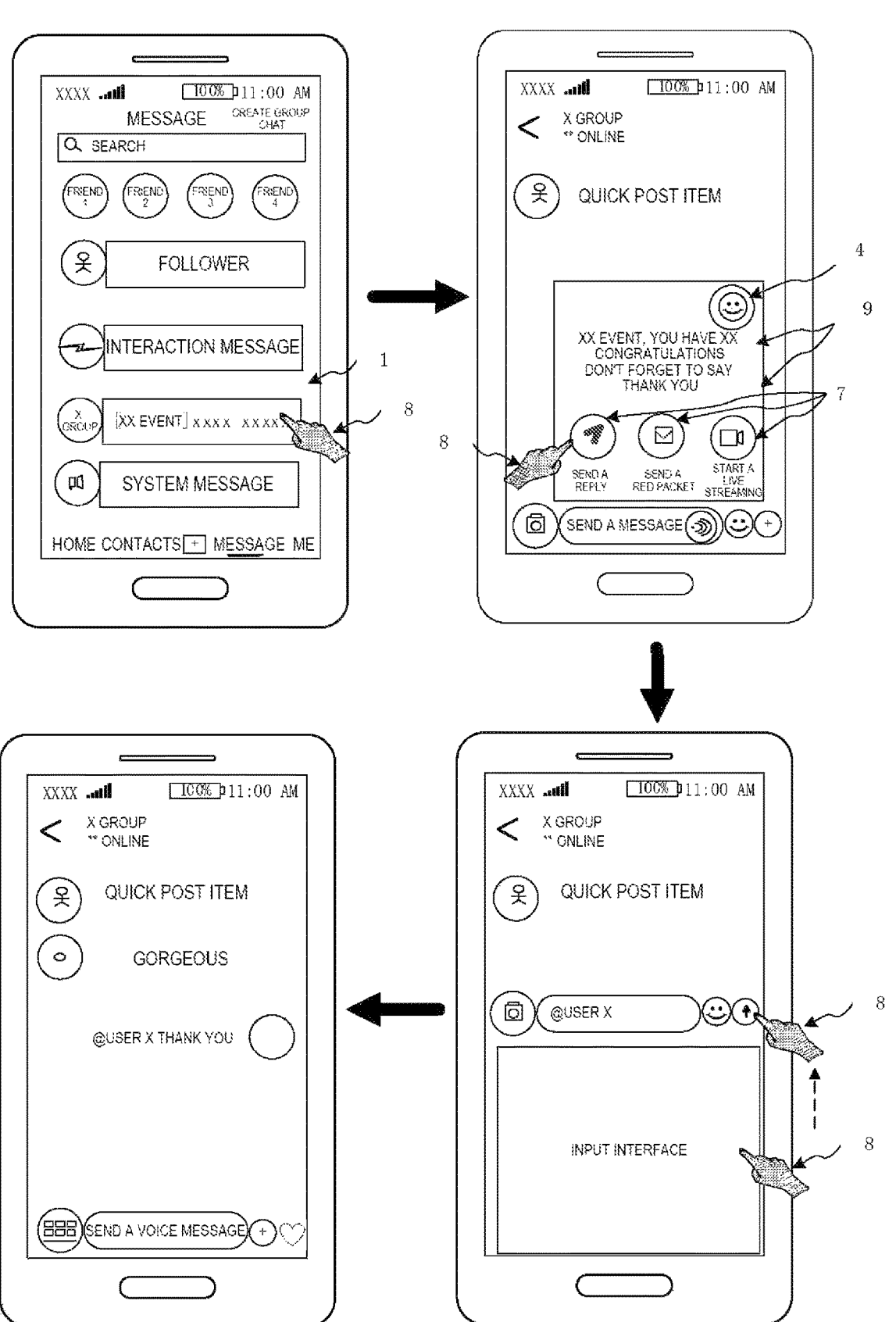
FIG. 5 is a schematic diagram of an interface for a further method for interaction according to the first embodiment of the present disclosure.

FIG. 5 is a schematic diagram of an interface for a further method for interaction according to the first embodiment of the present disclosure. As shown in FIG. 5, this example is illustrated with the target user 8 side as an example. After the target user 8 operates the message indication control of the target group in the message indication interface 1, the interaction controls 7, the description information 9 on the target user 8 side, and the identification information 4 of the target user are presented in the conversation interface 3. The interaction controls 7 in FIG. 5 includes controls for message sending, such as a control corresponding to sending a reply for the message; controls for virtual resource transfer, such as the "send red packet" button in FIG. 5; and/or controls for interactive celebration. The control for user interactive celebration can enable the target user 8 and the rest members to achieve real-time interaction, for example, the control of interactive celebration can be a control for multi-user real-time voice chat and multi-user real-time video chat. For example, the control of interactive celebration can be the "start live streaming for celebration" button in FIG. 5.

After target user 8 operates a control for message sending, the input interface can be presented in the conversation interface 3, and target user 8 can realize content input by operating the input interface. After presenting the input interface, the user who needs to be reminded can be automatically associated to the text field. For example, if user x is a user currently celebrating target user 8, after presenting the input interface, user x can be automatically associated to the text field. After sending the edited information, user x can be notified to view the message.

Figure 6:
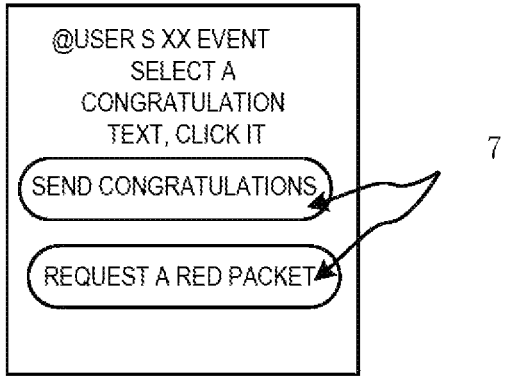
FIG. 6 is a schematic diagram of an interaction control provided by the first embodiment of the present disclosure.

FIG. 6 is a schematic diagram of an interaction control provided by the first embodiment of the present disclosure. Referring to FIG. 6, the interaction control 7 can be presented in the card form. No restrictions on the presentation form and presentation position of the interaction control 7 in the present disclosure. No restrictions on the response mode after the interaction control 7 is triggered. For example, after operating the interaction control 7 that "send congratulations", an input interface can be presented to achieve the editing of congratulation text. After operating the sending control, the congratulation text can be sent. After operating the interaction control 7 for requesting virtual resource transfer, the content representing the request for virtual resource transfer can be sent to the conversation interface 3.

Figure 7:
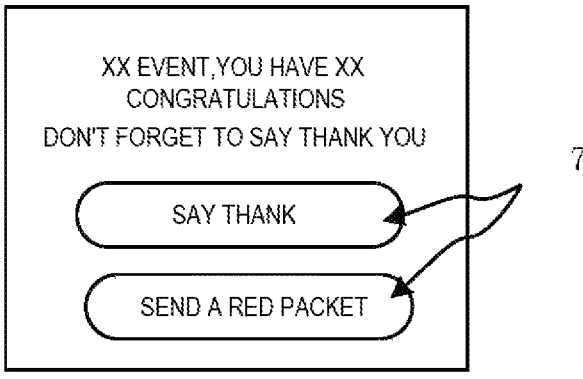
FIG. 7 is a schematic diagram of a further interaction control provided by the first embodiment of the present disclosure.

FIG. 7 is a schematic diagram of a further interaction control provided by the first embodiment of the present disclosure. As shown in FIG. 7, after operating the interaction control 7 of "say thank", an input interface can be presented to achieve the editing of the appreciation message, and the sending of the appreciation message can be realized after the operation of the sending control. After operating the interaction control 7 of the virtual resource transfer, the virtual resource transfer interface is triggered.

In one embodiment, the interaction control comprises a virtual resource transfer control, the virtual resource transfer control for implementing the transfer of virtual resources between the rest group members and the target user.

In one embodiment, a virtual resource transfer interface is triggered if the virtual resource transfer control is triggered, the virtual resource transfer interface is used to set at least one of a class and amount of the virtual resource to be transferred.

By selecting the class of virtual resource, the type of virtual resource to be transferred can be determined. No restrictions on the type of virtual resource. As an example, virtual resources include virtual assets.

In one embodiment, the interaction control is obtained based on a match of the predetermined objective.

In order to improve the convenience of interaction, the interaction controls presented in this disclosure can be directly obtained based on a match of the predetermined objective. For example, different predetermined objectives can correspond to different interaction controls, and the correspondence between predetermined objectives and interaction controls can be predetermined or determined after learning the historical behavior data of users obtained through user authorization. No restrictions on the matching mode between the interaction controls and predetermined objectives.

In the method for interaction provided by the first embodiment of the present disclosure, first whether the target user in the target group within the application achieves a predetermined objective is determined firstly; if the target user finally achieves the predetermined objective, interaction controls are presented on the conversation interface of the target group, and the interaction controls are used to realize the interaction between the rest group members and the target user in the target group, and the rest group members are group members of the target group other than the target user. Using the method as described above, the technical problem of insufficient interaction forms in the target group is solved, and the target control can be automatically presented on the conversation interface of the target group after the target user finally achieves the predetermined objective, to promote interaction between the target user and the rest group members, enhancing the interactivity of the target group.

On the basis of the above embodiment, a variant of the above embodiment is provided. In order to make the description brief, only the difference between the embodiments described as above and the variation is described.

In one embodiment, the predetermined objective comprises the number of users that have a predetermined association with the target user within the application being greater than or equals to a first predetermined threshold.

The value of the first predetermined threshold is not limited here. The first predetermined threshold can be any threshold or any value in the first threshold set.

As an example, the predetermined objective is the number of users having a one-way association with the target user being greater than or equal to a first predetermined threshold value, the number of users of the one-way following target user being greater than or equal to a first predetermined threshold value, i.e., the number of followers of the target user reaches a new milestone. The first predetermined threshold value may be 10,000.

In one embodiment, the first predetermined threshold value is any value in the first threshold set.

A first set of predetermined thresholds may include a number of different levels, such as 10,000, 100,000 and 200,000.

When the number of users with predetermined association with the target user is greater than or equal to any value in the first predetermined threshold set, it can be considered that the target user has achieved the predetermined objective.

In one embodiment, the predetermined objective comprises the number of users that participate in an event associated with the target user within the application being greater than or equals to a second predetermined threshold.

The value of the second predetermined threshold is not limited here. The second predetermined threshold can be any threshold or any value in the second threshold set.

For example, the number of users participating in events associated with the target user can be the number of users watching the live streaming of the target user, that is, the number of online users in the a live room of the target user; it can also be the number of users participating a voice chat with the target user; it can also be the number of users participating a video chat with the target user.

In one embodiment, the second predetermined threshold value is a second predetermined threshold value set to any one value.

The second set of predetermined thresholds may include a number of different levels, such as 10,000, 50,000 and 100,000.

When the number of users participating in events associated with the target user within the application is greater than or equal to any value in the second predetermined threshold set, the target user can be considered to have achieved the predetermined objective.

In one embodiment, the predetermined objective comprises a number of interactions associated with the target user within the application being greater than or equal to a third predetermined threshold.

The third predetermined threshold can be any value or any value in the third predetermined threshold set.

For example, the number of interactions associated with the target user within the application includes the number of historical likes to the target user.

In one embodiment, the third predetermined threshold value is a third set of any predetermined threshold value.

The third set of predetermined thresholds may include a number of different levels, such as 10,000, 30,000 and 50,000.

When the number of interactions associated with the target user in the application is greater than or equal to any value in the third predetermined threshold set, it can be considered that the target user has achieved the predetermined objective.

In the present disclosure, no restrictions on the values included in the first predetermined threshold set, the second predetermined threshold set, and the third predetermined threshold set.

Embodiment 2

FIG. 8 is a flowchart of a method for interaction according to the second embodiment of the present disclosure. The second embodiment of the present embodiment will be described based on the above embodiment. In the present embodiment, comprising: determining whether the interaction control in the conversation interface is triggered; if the interaction control is triggered, the interaction information corresponding to the interaction control is presented on the conversation interface.

The content which is not described in detail in the second embodiment may be referred to the first embodiment.

As shown in FIG. 8, the present disclosure provides a second embodiment of a method for interaction, comprising:

S210, determine whether the target user in the target group within the application achieves the predetermined objective.

S220, determine whether the user achieves the predetermined objective and if the user achieves the predetermined objective, execute S230; if the user does not achieve the predetermined objective, execute S210.

S230, present interaction controls on the conversation interface of the target group.

S240, determine whether the interaction control in the conversation interface is triggered. If the interaction control is triggered, execute S250; if the interaction control is not triggered, execute S240.

After the user operates the interaction control, the interaction control is triggered, and the detection method for whether it has been triggered is not limited here. For example, after receiving the instruction for the corresponding interaction control to be triggered, it can be considered that the interaction control is triggered; if no instruction for the interaction control to be triggered is received, it can be considered that the interaction control has not been triggered.

S250, present interaction information corresponding to the interaction control on the conversation interface.

Different interaction controls correspond to different interaction information, and the interaction information is not limited here. Exemplary interaction information includes operating controls for virtual resource transfer, editing corresponding content in the virtual resource transfer interface, and sending virtual resource collection information to the conversation interface; interaction information also includes information requesting virtual resource transfer sent to the conversation interface after operating controls for requesting virtual resource transfer; interaction information also includes information sent to the conversation interface after operating controls for message sending. The information includes location, shortcut phrases, and emojis.

The operation control described in this disclosure can be considered as a trigger control. For example, the control for requesting the virtual resource transfer can be considered as a trigger control used to request virtual resource transfer.

A method for interaction provided in the second embodiment of the present disclosure defines an operation of presenting interaction information in the conversation interface. With this method, after the target user achieves a predetermined objective, the interaction control is automatically presented in the conversation interface, and after the interaction control is triggered, the corresponding interaction information is presented in the conversation interface, thereby realizing the interaction between the target user and the rest group members and improving the interactivity of the target group.

Embodiment 3

FIG. 9 is a schematic diagram of the structure of an apparatus for interaction provided in the third embodiment of the present disclosure, the apparatus may be adapted to enhance the interaction between the target user and the rest group members of the target group application, the apparatus may be software and/or hardware implementation, and generally integrated on an electronic device.

As shown in FIG. 9, the apparatus includes:

A determination module 91, configured for determining whether a target user in a target group within an application achieves a predetermined objective; a presentation module 92 configured for in response to that the target user achieves the predetermined objective, presenting an interaction control on a conversation interface of the target group, wherein the interaction control is configured for an interaction between the target user and rest group members in the target group and the rest group members are group members of the target group other than the target user.

In the present embodiment, the apparatus first determines whether the target user in the target group within the application achieves a predetermined objective by the determination module 91; and finally, when the target user achieves the predetermined objective, the interaction control is presented in the conversation interface of the target group by the present module 92, and the interaction control is used to realize the interaction between the rest group members of the target group and the target user, and the rest group members are group members of the target group other than the target user.

The present embodiment provides an apparatus for interaction capable of automatically presenting the target control is in the conversation interface of the target group after target user achieves a predetermined objective, to facilitate interaction between the target user and the rest group members, enhancing the interactivity of the target group.

In one embodiment, the predetermined objective includes the predetermined objective comprises the number of users that have a predetermined association with the target user within the application being greater than or equals to a first predetermined threshold.

In one embodiment, the first predetermined threshold value is a value from a first predetermined set of thresholds.

In one embodiment, the predetermined objective comprises the number of users that participate in an event associated with the target user within the application being greater than or equals to a second predetermined threshold.

In one embodiment, the second predetermined threshold value is a value from a second predetermined the set of thresholds.

In one embodiment, the predetermined objective comprises a number of interactions associated with the target user within the application being greater than or equal to a third predetermined threshold.

In one embodiment, the third predetermined threshold value is a value from a third predetermined set of thresholds.

In one embodiment, the apparatus further comprises an interaction information presentation module configured for:

determining whether the interaction control on the conversation interface is triggered; and if the interaction control is triggered, presenting interaction information corresponding to the interaction control on the conversation interface.

In one embodiment, the interaction control comprises a virtual resource transfer control for implementing a transfer of a virtual resource between the target user and the rest group members.

In one embodiment, a virtual resource transfer interface is triggered if the virtual resource transfer control is triggered, wherein the virtual resource transfer interface is used to set at least one of a class and amount of the virtual resource to be transferred.

In one embodiment, the interaction control is obtained based on a match of the predetermined objective.

The apparatus for the interaction as described above may perform the interactive method disclosed in any embodiment provided herein, the method comprises performing the corresponding functional modules and effects.

Embodiment 4

FIG. 10 is a schematic structural diagram of an electronic device according to the fourth embodiment of the present disclosure. FIG. 10 shows a schematic structural diagram of an electronic device 100 suitable for implementing the present disclosure. The electronic device 100 in the present disclosure embodiment may include mobile end points such as mobile phones, laptops, digital broadcast receivers, personal digital assistants (Personal Digital Assistant, PDA), tablet computers (Portable Android Device, PAD), portable multimedia players (Portable Media Player, PMP), car-mounted end points (such as car navigation end points), and fixed end points such as digital televisions (Television, TV), desktop computers, etc. The electronic device 100 shown in FIG. 10 is only an example and should not bring any limitations on the functionality and scope of use of the present disclosure.

As shown in FIG. 10, the electronic device 100 may include one or more processing devices (such as a Central Processor, graphics processing unit, etc.) 101, which can perform various appropriate actions and processes based on programs stored in Read-Only Memory (ROM) 102 or programs loaded from storage device 108 into Random Access Memory (RAM) 103. One or more processing devices 101 implement interactive methods as provided in this disclosure. In RAM 103, various programs and data required for the operation of the electronic device 100 are also stored. Processing devices 101, ROM 102, and RAM 103 are connected to each other through bus 104. Input/Output (I/O) interface 105 is also connected to bus 104.

Typically, the following devices can be connected to the I/O interface 105: input devices 106 including touch screens, touchpads, keyboards, mice, cameras, microphones, accelerometers, gyroscopes, etc.; output devices 107 including liquid crystal presents (LCDs), speakers, vibrators, etc.; storage devices 108 including magnetic tapes, hard disks, etc., which are set to store one or more programs; and communication devices 109. Communication devices 109 can allow end point devices 100 to communicate wirelessly or wirelessly with other devices to exchange data. Although FIG. 10 shows an electronic device 100 with multiple devices, it should be understood that it is not required to implement or have all of the devices shown. More or fewer devices can be implemented or provided instead.

According to embodiments of the present disclosure, the process described above with reference to the flowchart may be implemented as a computer software program. For example, embodiments of the present disclosure include a computer program product comprising a computer program carried on a computer-readable medium, the computer program comprising program code for performing the method shown in the flowchart. In such embodiments, the computer program can be downloaded and installed from the network via the communication device 109, or installed from the storage device 108, or from the ROM 102. When the computer program is executed by the processing device 101, the above-described functions defined in the method of the present disclosure are performed.

The computer-readable storage medium described above can be a computer-readable signal medium or a computer-readable storage medium, or any combination thereof. The computer-readable storage medium can be, for example, but not limited to, an electrical, magnetic, optical, electromagnetic, infrared, or semiconductor system, device, or device, or any combination thereof. Examples of computer-readable storage media can include but are not limited to: an electrical connection with one or more wires, a portable computer disk, a hard disk, RAM, ROM, an erasable programmable read-only memory (EPROM or flash memory), an optical fiber, a portable compact disk read-only memory (CD-ROM), an optical storage device, a magnetic storage device, or any suitable combination thereof. In this disclosure, a computer-readable storage medium can be any tangible medium containing or storing a program that can be used by an instruction execution system, device, or device, or in combination therewith. In this disclosure, a computer-readable signal medium can include a data signal propagated in baseband or as part of a carrier wave, which carries computer-readable program code. Such propagated data signals can take many forms, including but not limited to electromagnetic signals, optical signals, or any suitable combination thereof. Computer-readable signal media can also be any computer-readable medium other than computer-readable storage media, which can send, propagate, or transmit programs for use by or in conjunction with instruction execution systems, devices, or devices. The program code contained on the computer-readable medium can be transmitted using any suitable medium, including but not limited to: wires, optical cables, radio frequency (RF), etc., or any suitable combination thereof.

In some implementation methods, clients and servers can communicate using any currently known or future developed network protocol such as Hyper Text Transfer Protocol (HTTP), and can interconnect with any form or medium of digital data communication (such as communication networks). Examples of communication networks include local area networks (LANs), wide area networks (WANs), the Internet (such as the Internet), and end-to-end networks (such as ad hoc end-to-end networks), as well as any currently known or future developed networks.

The computer-readable medium can be included in the electronic device 100, or it can exist alone without being assembled into the electronic device 100.

The above-mentioned computer-readable medium stores one or more computer programs, and when the above-mentioned one or more programs are executed by the processing device, the following methods are implemented:

determining whether a target user in a target group within an application achieves a predetermined objective; and in response to that the target user achieves the predetermined objective, presenting an interaction control on a conversation interface of the target group, wherein the interaction control is configured for an interaction between the target user and rest group members in the target group.

The computer-readable medium carrying one or more programs, when the one or more programs are executed by the end point device, so that the electronic device 100 may be in one or more programming languages or combinations thereof to write computer program code for performing the operations of the present disclosure, the above-described programming languages include Object Oriented programming languages, such as Java, Smalltalk, C++, further comprising conventional procedural programming languages, such as "C" language or similar programming language. The program code may be executed entirely on the user's computer, partially executed on the user's computer, executed as a separate software package, partially executed on the user's computer on a remote computer, or completely executed on a remote computer or server. In the case involving a remote computer, the remote computer may be connected to the user's computer via any kind of network, including LAN or WAN, or may be connected to an external computer (e.g., using an Internet service provider to connect via the Internet).

The flowcharts and block diagrams in the accompanying drawings illustrate the architecture, functions, and operations of systems, methods, and computer program products that may be implemented in accordance with various embodiments of the present disclosure. each block in the flowcharts or block diagrams may represent a module, program segment, or portion of code that contains one or more executable instructions for implementing a specified logical function. It should also be noted that in some alternative implementations, the functions indicated in the blocks may also occur in a different order than those indicated in the figures. For example, two blocks represented in succession may actually be executed substantially in parallel, and they may sometimes be executed in reverse order, depending on the functions involved. It should also be noted that each block in the block diagrams and/or flowcharts, and combinations of blocks in the block diagrams and/or flowcharts, may be implemented using a dedicated hardware-based system that performs the specified functions or operations, or may be implemented using a combination of dedicated hardware and computer instructions.

Described in the present embodiment relates to the disclosed module may be implemented by way of software, may be implemented by way of hardware. Wherein the name of the module in one case does not constitute a limitation on the module itself.

The functions described above in this article can be performed at least in part by one or more hardware logic components. For example, without limitation, exemplary types of hardware logic components that can be used include: Field Programmable Gate Arrays (FPGAs), Application Specific Integrated Circuits (ASICs), Application Specific Standard Parts (ASSPs), System on Chip (SOCs), Complex Programmable Logic Devices (CPLDs), and so on.

In the context of this disclosure, machine-readable media can be tangible media that can contain or store programs for use by or in conjunction with instruction execution systems, devices, or devices. Machine-readable media can be machine-readable signal media or machine-readable storage media. Machine-readable media can include, but are not limited to, electronic, magnetic, optical, electromagnetic, infrared, or semiconductor systems, devices, or devices, or any suitable combination thereof. Examples of machine-readable storage media may include electrical connections based on one or more wires, portable computer disks, hard disks, RAM, ROM, EPROM or flash memory, optical fibers, CD-ROMs, optical storage devices, magnetic storage devices, or any suitable combination thereof.

According to one or more embodiments of the present disclosure, Example 1 provides a method for interaction, comprising:

determining whether a target user in a target group within an application achieves a predetermined objective;

in response to that the target user achieves the predetermined objective, presenting an interaction control on a conversation interface of the target group, wherein the interaction control is configured for an interaction between the target user and rest group members in the target group.

According to one or more embodiments of the present disclosure, Example 2 according to the method of Example 1, the predetermined objective comprises the number of users that have a predetermined association with the target user within the application being greater than or equals to a first predetermined threshold.

According to one or more embodiments of the present disclosure, Example 3 according to the method of Example 2, the first predetermined threshold value is a value from a first predetermined set of thresholds.

According to one or more embodiments of the present disclosure, Example 4 according to the method of Example 1, the predetermined objective comprises the number of users that participate in an event associated with the target user within the application being greater than or equals to a second predetermined threshold.

According to one or more embodiments of the present disclosure, Example 5 according to the method of Example 4, the second predetermined threshold value is a value from a second predetermined the set of thresholds.

According to one or more embodiments of the present disclosure, Example 6 according to the method of Example 1, the predetermined objective comprises a number of interactions associated with the target user within the application being greater than or equal to a third predetermined threshold.

According to one or more embodiments of the present disclosure, Example 7 according to the method of Example 6, the third predetermined threshold value is a value from a third predetermined set of thresholds.

According to one or more embodiments of the present disclosure, Example 8 according to the method of Example 1, further comprising:

determining whether the interaction control on the conversation interface is triggered;

if the interaction control is triggered, presenting interaction information corresponding to the interaction control on the conversation interface.

According to one or more embodiments of the present disclosure, Example 9 according to the method of Example 1, the interaction control comprises a virtual resource transfer control for implementing a transfer of a virtual resource between the target user and the rest group members According to one or more embodiments of the present disclosure, Example 10 according to the method of Example 9, a virtual resource transfer interface is triggered if the virtual resource transfer control is triggered, wherein the virtual resource transfer interface is used to set at least one of a class and amount of the virtual resource to be transferred.

According to one or more embodiments of the present disclosure, Example 11 according to the method of Example 1, the interaction control is obtained based on a match of the predetermined objective.

According to one or more embodiments of the present disclosure, Example 12 provides an apparatus for interactive comprising:

a determination module, configured for determining whether a target user in a target group within an application achieves a predetermined objective;

a presentation module configured for in response to that the target user achieves the predetermined objective, presenting an interaction control on a conversation interface of the target group, wherein the interaction control is configured for an interaction between the target user and rest group members in the target group and the rest group members are group members of the target group other than the target user.

According to one or more embodiments of the present disclosure, Example 13 provides an electronic device comprising:

one or more processing devices;

a storage device configured to store one or more programs;

the one or more programs, when executed by the one or more processors, cause the one or more processors to implement the method for interaction as described in any one of Examples 1-11.

According to one or more embodiments of the present disclosure, Example 14 provides a computer-readable medium storing a computer program thereon, the program, when executed by a processor, implementing the method for interaction as described in any one of Examples 1-11.

In addition, although multiple operations are depicted in a specific order, this should not be understood as requiring these operations to be performed in the specific order shown or in sequential order. Under certain circumstances, multitasking and parallel processing may be advantageous. Similarly, although multiple implementation details are included in the above discussion, these should not be construed as limiting the scope of the present disclosure. Some features described in the context of individual embodiments can also be implemented in combination in a single embodiment. Conversely, multiple features described in the context of a single embodiment can also be implemented in multiple embodiments separately or in any suitable sub combination.

We claim:

1. A method for improving interactivity of an application, comprising:

displaying an interface of the application, wherein the interface of the application is a conversation interface of a group in the application;

determining whether a first user in the group achieves a predetermined objective among a plurality of predetermined objectives; and in response to determining that the first user achieves the predetermined objective, automatically presenting an interaction control on the conversation interface of the group in the application, wherein the interaction control is configured to implement an interaction between the first user and a second user in the group, wherein the application provides different interaction controls corresponding to different predetermined objectives, and the interaction control automatically presented on the conversation interface corresponds to the predetermined objective achieved by the first user, and wherein the interaction control comprises at least one of an emoji sending control, a message sending control, or a virtual resource transfer control, and the virtual resource transfer control is configured to transfer a virtual resource between the second user and the first user in the application.

2. The method of claim 1, wherein the predetermined objective comprises the number of users that have a predetermined association with the first user being greater than or equals to a first predetermined threshold.

3. The method of claim 2, wherein the first predetermined threshold value is a value from a first predetermined set of thresholds.

4. The method of claim 1, wherein the predetermined objective comprises the number of users that participate in an event associated with the first user within the application being greater than or equals to a second predetermined threshold.

5. The method of claim 4, wherein the second predetermined threshold value is a value from a second predetermined the set of thresholds.

6. The method of claim 1, wherein the predetermined objective comprises a number of interactions associated with the first user within the application being greater than or equal to a third predetermined threshold.

7. The method of claim 6, wherein the third predetermined threshold value is a value from a third predetermined set of thresholds.

8. The method of claim 1, further comprising:

determining whether the interaction control on the conversation interface is triggered; and if the interaction control is triggered, presenting interaction information corresponding to the interaction control on the conversation interface.

9. The method of claim 1, wherein a virtual resource transfer interface is triggered if the virtual resource transfer control is triggered, wherein the virtual resource transfer interface is used to set at least one of a class and amount of the virtual resource to be transferred.

10. An apparatus of improving interactivity of an application, comprising:

one or more processors; and a storage apparatus storing one or more programs, the one or more programs, when executed by the one or more processors, cause the apparatus to perform a method comprising:

displaying an interface of the application, wherein the interface of the application is a conversation interface of a group in the application;

determining whether a first user in the group achieves a predetermined objective among a plurality of predetermined objectives; and

in response to determining that the first user achieves the predetermined objective, automatically presenting an interaction control on the conversation interface of the group in the application, wherein the interaction control is configured to implement an interaction between the first user and a second user in the group, wherein the application provides different interaction controls corresponding to different predetermined objectives, and the interaction control automatically presented on the conversation interface corresponds to the predetermined objective achieved by the first user, and wherein the interaction control comprises at least one of an emoji sending control, a message sending control, or a virtual resource transfer control, and the virtual resource transfer control is configured to transfer a virtual resource between the second user and the first user in the application.

11. The apparatus of claim 10, wherein the predetermined objective comprises the number of users that have a predetermined association with the first user within the application being greater than or equals to a first predetermined threshold.

12. The apparatus of claim 10, wherein the predetermined objective comprises the number of users that participate in an event associated with the first user within the application being greater than or equals to a second predetermined threshold.

13. The apparatus of claim 10, wherein the predetermined objective comprises a number of interactions associated with the first user within the application being greater than or equal to a third predetermined threshold.

14. The apparatus of claim 10, wherein the apparatus is caused to perform the method further comprising:

determining whether the interaction control on the conversation interface is triggered; and

18 if the interaction control is triggered, presenting interaction information corresponding to the interaction control on the conversation interface.

15. The apparatus of claim 10, wherein a virtual resource transfer interface is triggered if the virtual resource transfer control is triggered, wherein the virtual resource transfer interface is used to set at least one of a class and amount of the virtual resource to be transferred.

16. A non-transitory computer-readable storage medium storing instructions which, when executed by a processor, cause the processor to perform a method comprising:

displaying an interface of the application, wherein the interface of the application is a conversation interface of a group in the application;

determining whether a first user in the group achieves a predetermined objective among a plurality of predetermined objectives; and in response to determining that the first user achieves the predetermined objective, automatically presenting an interaction control on the conversation interface of the group in the application, wherein the interaction control is configured to implement an interaction between the first user and a second user in the group, wherein the application provides different interaction controls corresponding to different predetermined objectives, and the interaction control automatically presented on the conversation interface corresponds to the predetermined objective achieved by the first user, and wherein the interaction control comprises at least one of an emoji sending control, a message sending control, or a virtual resource transfer control, and the virtual resource transfer control is configured to transfer a virtual resource between the second user and the first user in the application.

* * * * *